US012754685B2

(12) United States Patent
Pan et al.

(10) Patent No.: US 12,754,685 B2
(45) Date of Patent: Oct. 6, 2026

(54) MULTI-PARTITION FILE SYSTEM FOR STORING VIDEO STREAMS IN A MANAGED NON-VOLATILE MEMORY DEVICE

(71) Applicant: Micron Technology, Inc., Boise, ID (US)

(72) Inventors: Lei Pan, Shanghai (CN); Qi Dong, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 13 days.

(21) Appl. No.: 18/669,457

(22) Filed: May 20, 2024

(65) Prior Publication Data

US 2024/0311030 A1 Sep. 19, 2024

Related U.S. Application Data

(63) Continuation of application No. 17/842,197, filed on Jun. 16, 2022, now Pat. No. 12,019,892.

(30) Foreign Application Priority Data

May 5, 2022 (WO) ................ PCT/CN2022/090889

(51) Int. Cl.
*G06F 3/06* (2006.01)

(52) U.S. Cl.
CPC .......... *G06F 3/0644* (2013.01); *G06F 3/0604* (2013.01); *G06F 3/0643* (2013.01); *G06F 3/0673* (2013.01)

(58) Field of Classification Search
None
See application file for complete search history.

(56) References Cited

U.S. PATENT DOCUMENTS 11,416,312 B1 8/2022 Liu et al.
2010/0195538 A1* 8/2010 Merkey .................. H04L 43/02 370/255
2015/0134796 A1 5/2015 Theimer et al.
2015/0188969 A1* 7/2015 Boshev .................. H04L 65/80 709/203

(Continued)

OTHER PUBLICATIONS

International Search Report and Written Opinion, PCT App. No. PCT/CN2022/090889, Nov. 28, 2022, 9 pages.

(Continued)

*Primary Examiner* — Hosain T Alam
*Assistant Examiner* — Ryan Dare
(74) *Attorney, Agent, or Firm* — NICHOLSON DE VOS WEBSTER & ELLIOTT LLP

(57) ABSTRACT

Technologies for storing streaming data include, in some embodiments, in response to determining that the chunk size satisfies a chunk size threshold and the streaming data is sequential data of a size that satisfies a threshold sequential data size, writing the sequential data to a first file system partition of a file system comprising a plurality of file system partitions, and in response to determining that the chunk size does not satisfy the chunk size threshold or the chunk size satisfies the chunk size threshold and the streaming data is the first type of metadata, writing the streaming data to a second file system partition of the plurality of file system partitions.

20 Claims, 5 Drawing Sheets

(56) References Cited

U.S. PATENT DOCUMENTS

| | | | | |
|---|---|---|---|---|
| 2017/0099332 | A1* | 4/2017 | Bullotta | H04L 67/02 |
| 2017/0220267 | A1* | 8/2017 | Neelakanta | G06F 3/0688 |
| 2018/0191857 | A1* | 7/2018 | Schooler | G06F 16/24568 |
| 2018/0217785 | A1* | 8/2018 | Shin | G06F 3/0611 |
| 2019/0182188 | A1 | 6/2019 | Nugent et al. | |
| 2019/0310794 | A1* | 10/2019 | Eom | G06F 9/45558 |
| 2019/0364204 | A1 | 11/2019 | Wozniak et al. | |
| 2020/0134081 | A1 | 4/2020 | Ho | |
| 2020/0401316 | A1* | 12/2020 | Hankins | G06F 12/0868 |
| 2021/0149597 | A1* | 5/2021 | Kim | G06F 3/0679 |
| 2021/0216376 | A1* | 7/2021 | Zhang | G06F 9/5083 |
| 2021/0311660 | A1* | 10/2021 | Saxena | G06F 3/0659 |
| 2022/0019591 | A1* | 1/2022 | Roux | G06F 3/0631 |

OTHER PUBLICATIONS

Non-Final Office Action, U.S. Appl. No. 17/842,197, Nov. 13, 2023, 9 pages.

Notice of Allowance, U.S. Appl. No. 17/842,197, Feb. 21, 2024, 7 pages.

* cited by examiner

MULTI-PARTITION FILE SYSTEM FOR STORING VIDEO STREAMS IN A MANAGED NON-VOLATILE MEMORY DEVICE

CROSS-REFERENCE TO RELATED APPLICATION

The present application is a continuation of U.S. application Ser. No. 17/842,197, filed Jun. 16, 2022, which claims the benefits of International Application No. PCT/CN2022/090889 filed on May 5, 2022, which is hereby incorporated by reference.

TECHNICAL FIELD

The present disclosure generally relates to data stream storage, and more specifically, relates to a multi-partition file system for storing video streams in a managed non-volatile memory device.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices. A host system's operating system can interface with a memory subsystem through a file system.

A file system is a combination of a data structure and logic rules that control the manner in which data is organized, stored in, and retrieved from a memory subsystem. For example, a file system can separate data into pieces, e.g., files, and give each piece an identifier, e.g., a file name, by which the piece can be identified to the host system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
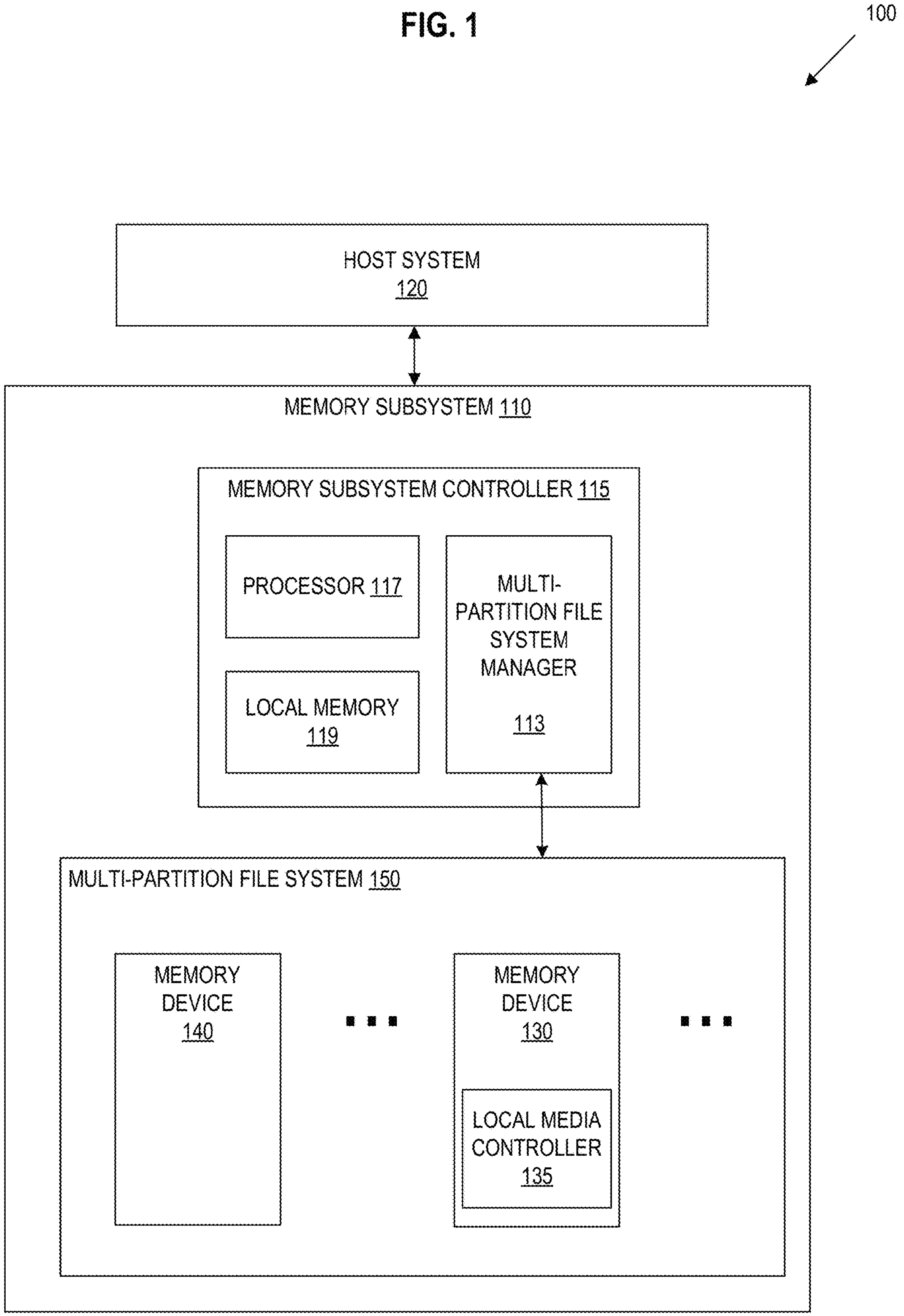
FIG. 1 illustrates an example computing system that includes a memory subsystem in accordance with some embodiments of the present disclosure.

Aspects of the present disclosure are directed to data management in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Conventionally, storage devices are configured with a single file system occupying the entire storage device. Another approach is to partition a storage device so that several file systems with different attributes can be used on the partitioned storage device. Whether a storage device is governed by a single file system or multiple file systems, the functional limits of each file system are defined by the maximum storable data capacity of the storage device.

Streaming data is data that is continuously generated by a single source or by a combination of different sources. Streaming data can be processed incrementally, without having access to all of the data, using stream processing techniques.

Certain types of streaming data have long presented challenges to the system designers attempting to configure conventional file systems to handle the storage of streaming data. For example, video stream recording for artificial intelligence-based applications, such as automotive and security camera/surveillance applications, can create streams of data that include a mix of large chunks of sequentially written and accessed data, such as sequences of images or video frames, and small chunks of randomly written and accessed data, such as metadata. These and other types of data streams can strain conventional file systems in terms of write bit rate and useable life of the underlying storage device.

In general, the requirements of stream storage applications include: a minimum write performance (to avoid stream data frame loss), a high storage capacity (to store the data streams for specified or extended durations of time), and a large total bytes written (TBW) (to extend the usable lifetime of the memory device). In some stream storage applications, data retention and/or read performance are of lower priority or can be sacrificed in favor of the write-related requirements.

Aspects of the present disclosure address the above requirements and deficiencies of other systems by creating a multi-partition file system and data management logic to manage the writing of streaming data to the multi-partition file system. The disclosed multi-partition file system approach is distinguished from other approaches that partition a storage device with each partition having its own file system, because in those approaches, the partitioned storage device has multiple file systems (one per partition), rather than a single file system.

The multi-partition file system design described herein can improve recording bit rate and extend the reliability and useful life of non-volatile components of a memory subsystem. For instance, the disclosed approaches can improve system performance and reliability by, for example, providing larger TBW and higher write bit rates. These improvements are particularly suitable for video stream storage-related applications and are useful for other applications, including but not limited to audio stream applications and other applications that involve the storage of streaming data having characteristics of, for example, larger chunks of data mixed with smaller chunks or a mix of larger-size sequential data and smaller-size random data.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130, 140 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a multi-partition file system manager component 113 that can create and manage a multi-partition file system 150 across multiple different and potentially heterogenous memory devices 140, 130. In some embodiments, the controller 115 includes at least a portion of the multi-partition file system manager component 113. For example, the controller 115 can include a processor 117 (processing device) configured to execute instructions stored in local memory 119 for performing the operations described herein. In some embodiments, a multi-partition file system manager component 113 is part of the host system 110, an application, or an operating system.

The multi-partition file system manager component 113 includes logic to store portions of streaming data in different partitions of the multi-partition file system 150, where the different partitions can correspond to different memory devices 140, 130. Further details with regard to the operations of the multi-partition file system manager component 113 and the structure of the multi-partition file system 150 are described below.

Figure 2:
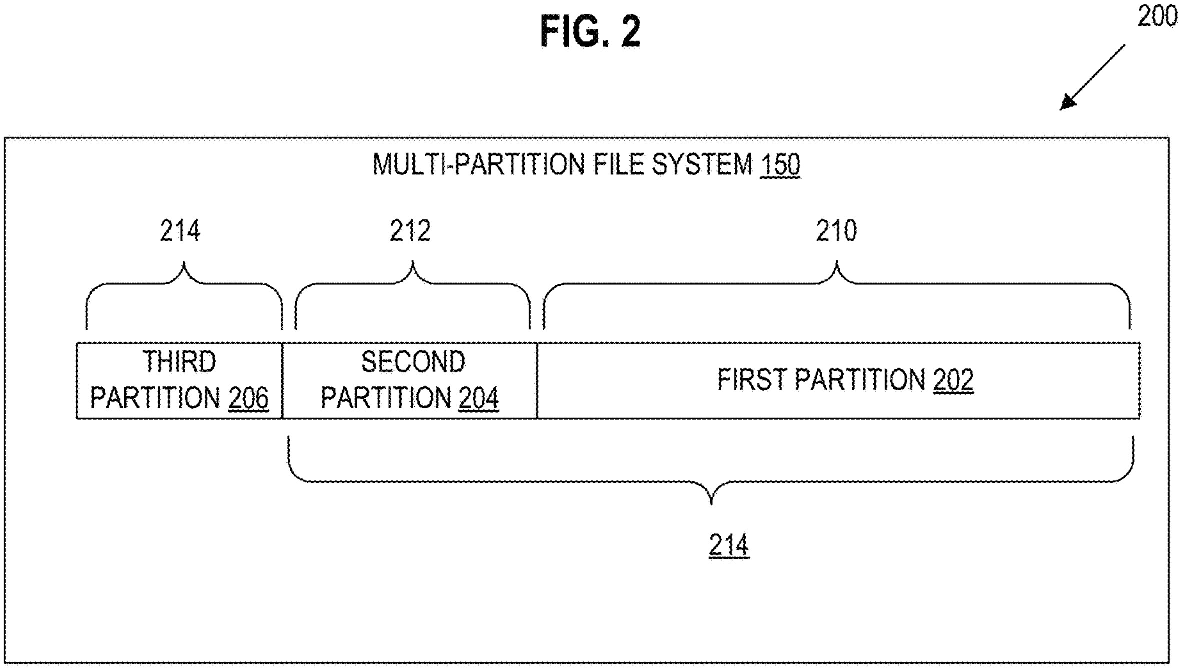
FIG. 2 illustrates an example of a multi-partition file system.

FIG. 2 illustrates an example 200 of multi-partition file system 150. The example 200 includes multiple file system partitions, e.g., a first file system partition 202, a second file system partition 204, and a third file system partition 206. Each file system partition has a partition configuration. A partition configuration for a given file system partition specifies, for example, one or more of the following: a partition size, a memory configuration (e.g., a particular type of non-volatile memory), a mapping method (e.g., a node-based method or a slot-based method), and a visibility (e.g., the partition is or is not visible to users of the file system).

In the example 200, first file system partition 202 has a first partition configuration 210, second file system partition 204 has a second partition configuration 212, and third file system partition 206 has a third partition configuration 214. First partition configuration 210 is different from second partition configuration 212, and third partition configuration 214 is different from both first partition configuration 210 and second partition configuration 212. For example, in some embodiments, the partition size of first partition configuration 210 is larger than the partition sizes of second partition configuration 212 and third partition configuration 214.

Also, in some embodiments, the memory configuration of the first partition configuration 210 is different from the memory configurations of both second partition configuration 212 and third partition configuration 214. For example, the first file system partition 202 contains a first type of non-volatile memory that is different from the types of non-volatile memory of both the second file system partition 204 and the third file system partition 206. In some embodiments, the third file system partition 206 is configured using a single-level cell (SLC) type of non-volatile memory while both the first file system partition 202 and the second file system partition 204 are configured using a type of non-volatile memory that is not the SLC type of non-volatile memory (e.g., a different bit density than SLC).

As another example, in some embodiments, the first file system partition 202 is configured according to a first endurance criterion, the second file system partition 204 is configured according to a second endurance criterion, and the third file system partition 206 is configured according to a third endurance criterion, where the first, second, and third endurance criteria are different. An example of an endurance criterion is useable life of a memory device. For instance, in some embodiments, the first endurance criterion is higher than both the second endurance criterion and the third endurance criterion, such that the first file system partition 202 is configured for very high endurance and high performance with retention compromise, while the second file system partition 204 and the third file system partition 206 are not configured for very high endurance or for high performance with retention compromise.

In some embodiments, the second file system partition 204 and the third file system partition 206 are configured differently from each other and differently from the first file system partition 202. For example, the second file system partition 204 is configured to store data that has a chunk size less than or equal to the chunk size threshold, or has a sequential data size less than or equal to the sequential size threshold, or does not require a long useful lifetime of the memory device, while the third file system partition 206 is configured for data that requires high reliability and thus an enhanced memory type such as SLC, but which has a chunk size less than or equal to the chunk size threshold or has a sequential data size less than or equal to the sequential size threshold.

As yet another example, in some embodiments, the first file system partition 202 is configured according to a first performance criterion, the second file system partition 204 is configured according to a second performance criterion, the third file system partition 206 is configured according to a third performance criterion, where the first, second, and third performance criteria are different. Examples of performance criteria include write bit rate and total bytes written. For instance, in some embodiments, the first performance criterion is higher than both the second performance criterion and the third endurance criterion, such that the first file system partition 202 is configured for high performance with retention compromise, while at least one of the second file system partition 204 and the third file system partition 206 is not configured for high performance with retention compromise.

In some embodiments, the second file system partition 204 and the third file system partition 206 are configured differently from each other and differently from the first file system partition 202. For example, the second file system partition 204 is configured to store data that has a chunk size less than or equal to the chunk size threshold or data that has a sequential data size less than or equal to the sequential size threshold or data that does not require a high performance memory device, while the third file system partition 206 is configured for data that requires high reliability and thus an enhanced memory type such as SLC, but which has a chunk size less than or equal to the chunk size threshold or has a sequential data size less than or equal to the sequential size threshold.

Figure 3:
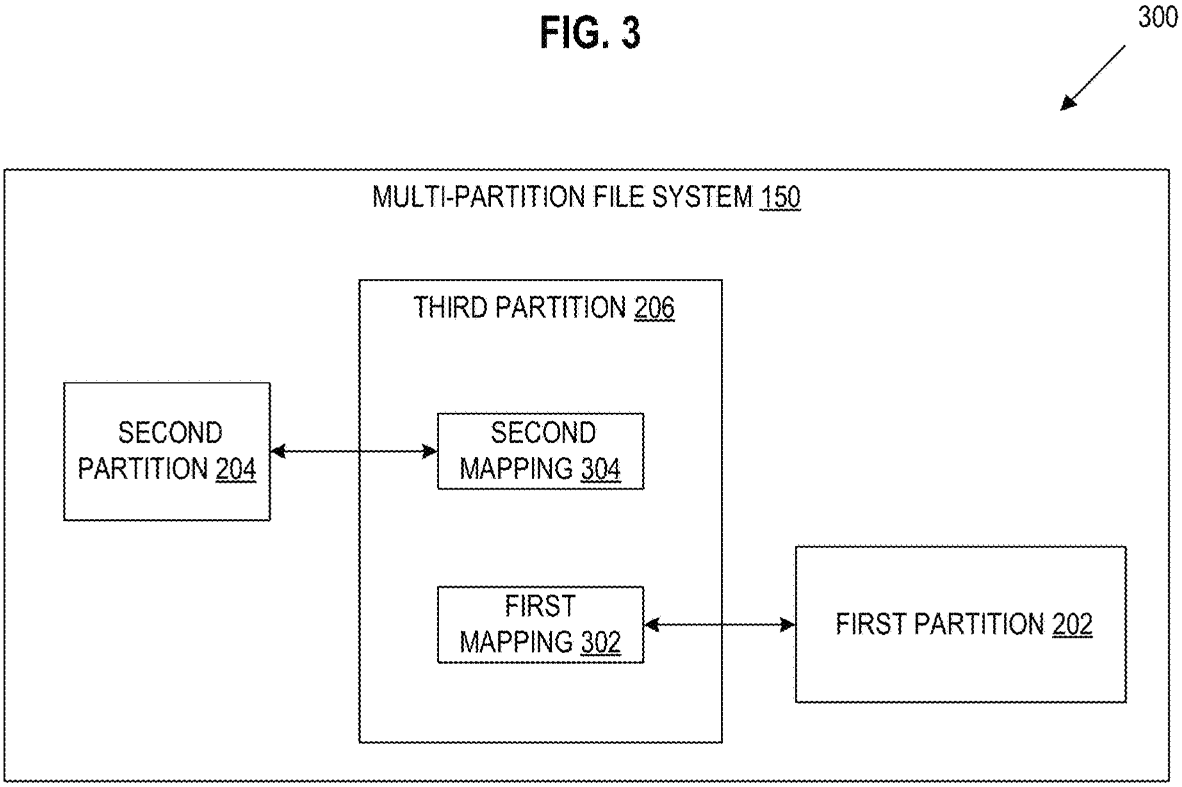
FIG. 3 illustrates an example of data management for a multi-partition file system.

Further, in some embodiments, the mapping method of the first partition configuration 210 is different from the mapping of the second partition configuration 212. FIG. 3, described below, illustrates an example of file system partitions with different mapping methods. Additionally, in some embodiments, some of the file system partitions 202, 204, 206 have a portion of their partition configurations in common. For instance, in embodiment 200, a partition configuration portion 214 is common to both first file system partition 202 and second file system partition 204. In some embodiments, the common partition configuration portion 214 is visibility. For example, first file system partition 202 and second file system 204 are both visible to the file system user while third file system partition 206 is not visible to the file system user. In some embodiments, the third file system partition 206 is configured to store file system metadata of the multi-partition file system 150 while both the first file system partition 202 and the second file system partition 204 are not configured to store file system metadata. For example, the third file system partition 206 is configured for higher reliability than either first file system partition 202 or second file system partition 204.

In other embodiments, the common partition configuration portion 214 is common to all of the file system partitions 202, 204, 206. For instance, all of first file system partition 202, second file system partition 204, and third file system partition 206 are invisible to the file system user in some embodiments.

The example shown in FIG. 2 is a design that can be used for streaming video storage applications. This disclosure is not limited to the design shown in FIG. 2. The design of FIG. 2 can be modified, altered, or adapted for other streaming data storage applications. For instance, the relative sizes and/or visibility of each of the file system partitions 202, 204, 206, and/or the number of different file system partitions, can be modified to suit the requirements of a particular application or implementation. Examples of file system metadata include logical unit identifier (LUN) data, namespace metadata, and partition metadata such as partition configuration data. In some embodiments, metadata for the mapping methods used by the file system partitions 202, 204 are stored in third file system partition 206.

FIG. 3 illustrates an example 300 of data management for a multi-partition file system. Data management for a multi-partition file system includes creating and maintaining a mapping of chunks of data to their respective partitions in the file system so that the chunks of data can be efficiently accessed and read from storage. In the example 300, third file system partition 206 maintains first mapping data 302 for first file system partition 202 and also maintains second mapping data 304 for second file system partition 204. In the example 300, first file system partition 202 and second file system partition 204 are configured to use different mapping methods. Thus, first mapping data 302 is different from second mapping data 304.

In some embodiments, the first file system partition 202 is managed by a slot mapping method rather than a conventional node-based mapping method. In some embodiments, the slot-based mapping method used in first file system partition 202 divides the memory area within the first file system partition 202 into slots that have a specified slot size. An example of a slot size that can be used is 4 megabytes (MB). In embodiments that use a slot mapping method, first mapping data 302 includes slot mapping data. Examples of slot mapping data include a file to slot (F2S) table and a valid slot bitmap (VSB) table. In the example 300, an F2S table and a VSB table for the first file system partition 202 are maintained in third file system partition 206. Use of a slot-based mapping method in the first file system partition 202 improves the file addressing speed, which in turn improves the write bit rate, particularly for larger chunks of sequential data.

In some embodiments, the mapping method used in second file system partition 204 is a node-based mapping method (and is not a slot-based mapping method). In some embodiments, the node-based mapping method used in second file system partition 204 divides the memory area within the second file system partition 204 into nodes. In some embodiments, the node-based mapping method used in second file system partition 204 is similar to a tree directory structure used in conventional node-based file systems such as FAT (file allocation table) or EXT (extended file system). In those embodiments, the second mapping data 304 includes node metadata.

The examples shown in FIG. 2 and FIG. 3 are not necessarily mutually exclusive. For instance, the file system partition configuration of FIG. 2 can be used in combination with the data management approach of FIG. 3 or with other data management approaches. Likewise, the data management approach of FIG. 3 can be used in combination with the file system partition configuration of FIG. 2 or with other file system partition configurations.

The example shown in FIG. 3 is a design that can be used for streaming video storage applications. This disclosure is not limited to the design shown in FIG. 3. The design of FIG. 3 can be modified, altered, or adapted for other streaming data storage applications. For instance, the mapping methods of each of the file system partitions 202, 204 can be modified to suit the requirements of a particular application or implementation.

Figure 4:
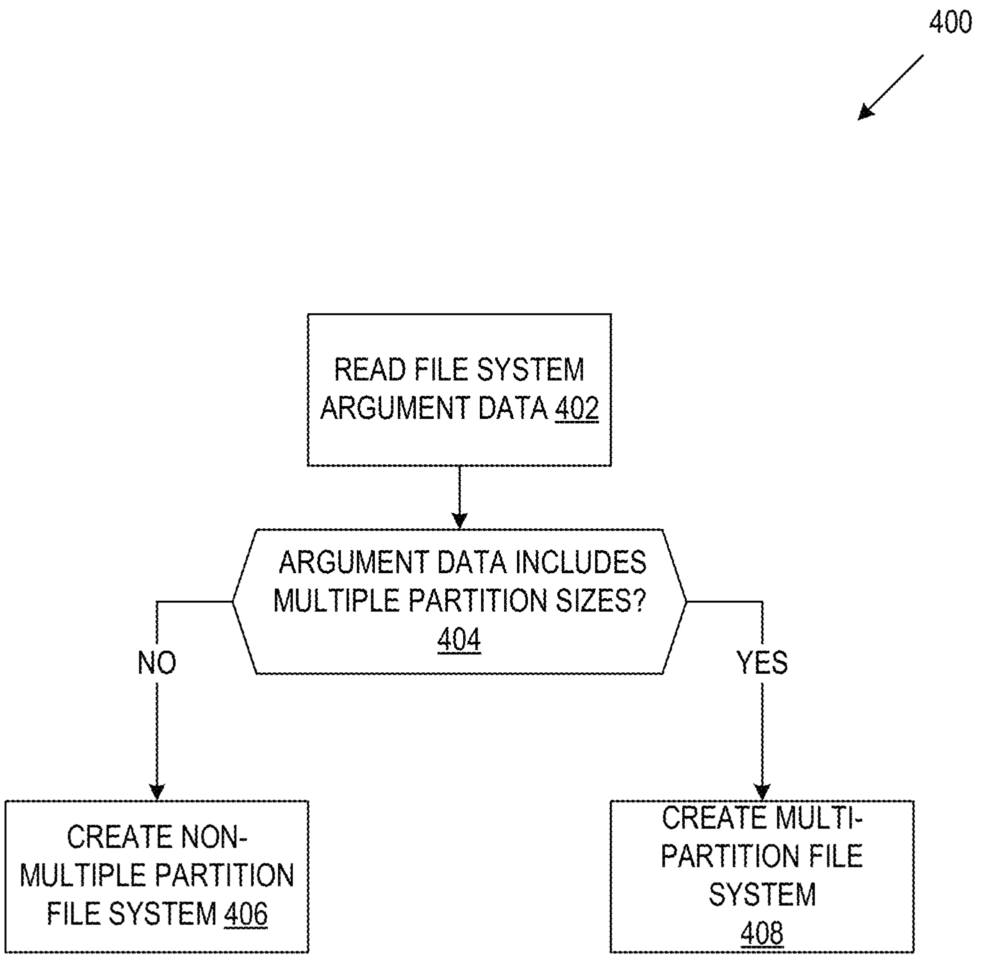
FIG. 4 is a flow diagram of an example method to create a multi-partition file system in accordance with some embodiments of the present disclosure.

FIG. 4 is a flow diagram of an example method to create a multi-partition file system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the multi-partition file system manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing device reads file system argument data. The file system argument data includes specifications for a new file system to be created. The file system argument data can be input by a file system designer, read from memory, or received, for example, through an application program interface (API). The file system argument data includes, for example, file system configuration data such as file system partition sizes, memory device configurations, and mapping methods.

At operation 404, the processing device determines whether the file system argument data read at operation 402 includes multiple partition sizes. Example parameters for creation of a file system including multiple partition sizes are described below. If the file system argument data read at operation 402 does not include multiple partition sizes, the processing device proceeds to operation 406.

At operation 406, the processing device creates a non-multiple-partition file system (e.g., a file system that does not include partitions). An example of a utility that can be used by the processing device to create a non-multiple-partition file system is MAKEFS.

If at operation 404, the processing device determines that the file system argument data read at operation 402 includes multiple partition sizes, the processing device proceeds to operation 408. At operation 408, the processing device creates a multiple-partition file system in accordance with this disclosure, based on the file system argument data read at operation 402.

To create the multiple-partition file system, the processing system determines, based on the file system argument data, file system partition configuration data including partition sizes for each of the file system partitions 202, 204, 206, a chunk size threshold, and a sequential data size threshold. The chunk size threshold and the sequential data size threshold are used by write processes to determine the file system partition to which incoming streaming data should be written.

In some embodiments, the processing device applies a file system creation utility, such as a modified version of MAKEFS that is capable of handling multiple-partition file system argument data, to the multiple-partition file system configuration data to create the multiple-partition file system. In one embodiment, to create the multi-partition file system on a target device, a user, such as a file system designer, provides values for the following parameters: size of the first file system partition, the slot size for the first system partition (e.g., 4 MB), a chunk size threshold (e.g., 128 KB), and a sequential write size threshold (e.g., 4 MB), which is used to distinguish whether data is to be written to the second file system partition or the first file system partition. In some embodiments, the file system create tool uses these parameters to generate the first file system partition according to the first file system partition size parameter value. The remaining capacity of the device may be divided among the third file system partition and the second file system. To configure the multi-partition file system management, the slot mapping table of the first file system partition is stored in the third file system partition, and metadata for the second file system partition is also stored in the third file system partition.

Once the multiple-partition file system is created, multiple-partition file system data management logic is used to write incoming data streams among the file system partitions 202, 204, 206. An example of multiple-partition file system data management logic is shown in FIG. 5, described below.

Figure 5:
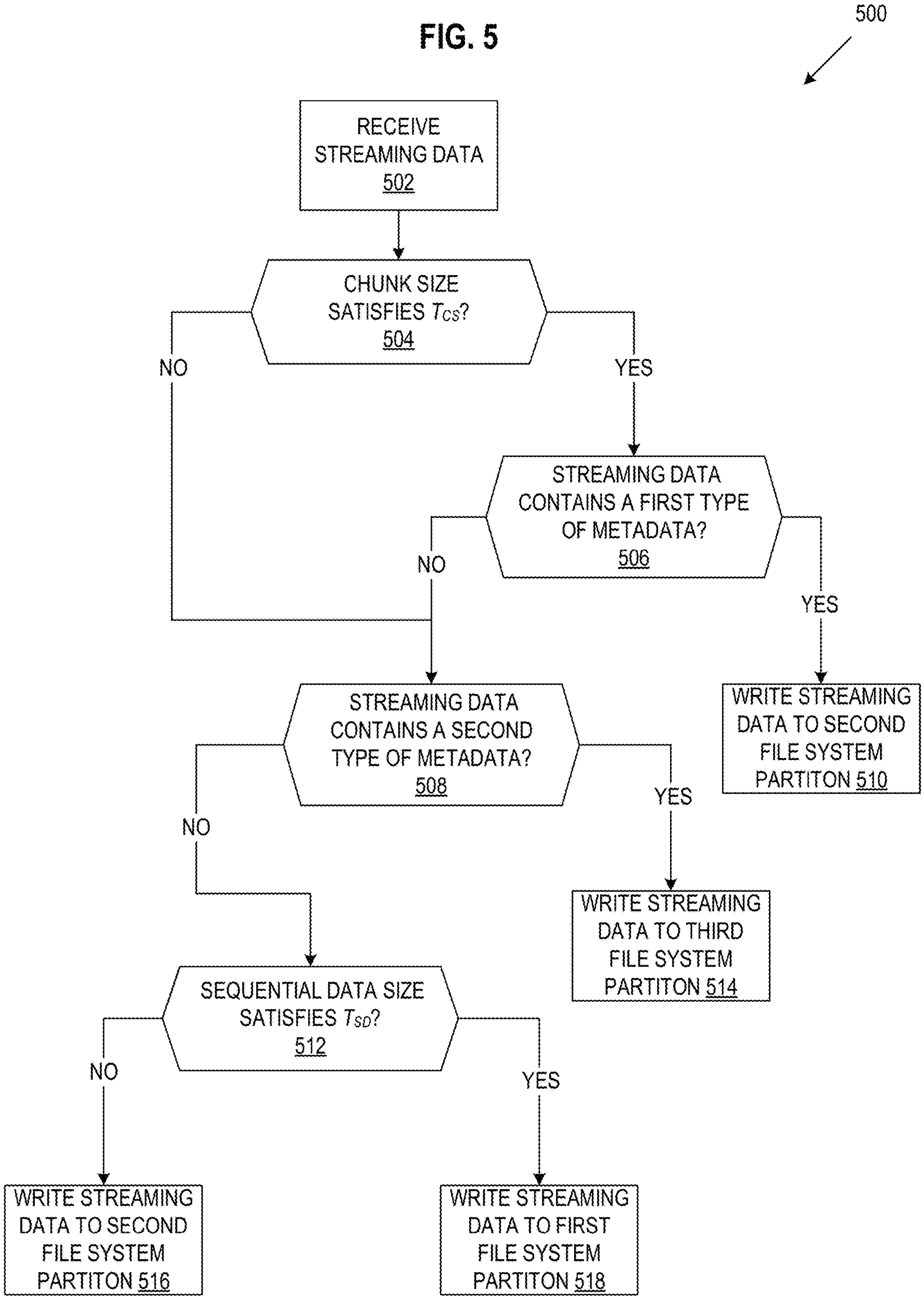
FIG. 5 is a flow diagram of an example method to write data to a multi-partition file system in accordance with some embodiments of the present disclosure.

FIG. 5 is a flow diagram of an example method to write data to a multi-partition file system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the multi-partition file system manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device reads streaming data. The streaming data has characteristics including a characteristic write behavior and a chunk size. Write behaviors can be classified as random or sequential. Random and sequential are types of addressing schemes. Data that has a random write behavior does not need to be written to sequential address spaces but can be written to random locations on a memory device. Data that has a sequential write behavior is written to a sequence of locations on a memory device such as a contiguous set of blocks.

Examples of streaming data that have sequential write behavior include video streams and snapshots. Examples of streaming data that have random write behavior include artificial intelligence (AI) metadata and file system metadata. Examples of AI metadata include data generated from AI computing processes, such as features, attributes, scores, or parameters calculated by an AI engine. Examples of snapshots include digital images or sequences of digital images, such as stills or video captured by a security camera or driver recorder. Examples of file system metadata include mapping data, such as node mapping data or slot mapping data.

Chunk size can refer to the size of a piece data that is ready for processing, without regard to whether the data is or is not sequential. Chunk sizes can be classified as large or small. For example, a chunk size can be considered large if the amount of data is greater than 128 kilobytes (KB). Examples of streaming data that have large chunk sizes include video streams and snapshots. Examples of streaming data that have small chunk sizes include artificial intelligence metadata and file system metadata.

At operation 504, the processing device determines whether the chunk size of the streaming data received at operation 502 satisfies a chunk size threshold $T_{cs}$. In one embodiment, the chunk size satisfies the chunk size threshold $T_{cs}$ when the chunk size is greater than threshold $T_{cs}$. If the chunk size of the streaming data received at operation 502 satisfies the chunk size threshold $T_{cs}$, the processing device proceeds to operation 506. If the chunk size of the streaming data received at operation 502 does not satisfy the chunk size threshold $T_{cs}$, the processing device proceeds to operation 508. In one embodiment, the chunk size fails to satisfy the chunk size threshold $T_{cs}$ when the chunk size is less than or equal to threshold $T_{cs}$. The value of chunk size threshold $T_{cs}$ can be determined, for example, based on the requirements of each particular design or implementation of memory subsystem 110, multi-partition file system manager 113, and/or multi-partition file system 150.

At operation 506, the processing device determines whether the streaming data received at operation 502 contains a first type of metadata. In some embodiments, the processing device determines whether the streaming data contains AI metadata. If the streaming data received at operation 502 contains the first type of metadata, the processing device proceeds to operation 510. If the streaming data received at operation 502 does not contain the first type of metadata, the processing device proceeds to operation 508.

At operation 508, the processing device determines whether the streaming data received at operation 502 contains a second type of metadata. In some embodiments, the processing device determines at operation 508 whether the streaming data received at operation 502 contains file system metadata. If the streaming data received at operation 502 contains the second type of metadata, the processing device proceeds to operation 514. If the streaming data received at operation 502 does not contain the second type of metadata, in some embodiments, the processing device proceeds to operation 512.

At operation 510, the processing device writes the streaming data received at operation 502 to a second file system partition, such as second file system partition 204. For example, the processing device writes streaming data that contains AI metadata to the second file system partition.

Operations 512, 516, 518 illustrate one approach for handling data that is not a large chunk size and is not the first type of metadata and is not the second type of metadata. In the illustrated approach, sequential data size is used to determine whether the streaming data is stored in the first file system partition or the second file system partition. In other approaches, operations 512, 516, 518 are modified, omitted, or replaced with other logic in accordance with the requirements of a particular design or implementation. For example, in some embodiments, the determination made at operation 508 is omitted and the flows from operation 504 and operation 506 proceed to operation 514. In other embodiments, the determination made at operation 512 is omitted and a no determination at operation 508 proceeds to operation 516. In still other embodiments, the determination made at operation 512 is omitted and a no determination at operation 508 proceeds to operation 518.

Sequential data is data that has some dependency on other data, such as time series data. An example of sequential data is a sequence of video frames or images. Examples of sequential data sizes include the size of a video stream and the size of a snapshot.

At operation 512, the processing device determines whether the sequential data size of the streaming data received at operation 502 satisfies a sequential data size threshold $T_{sp}$. If the sequential data size of the streaming data received at operation 502 satisfies the sequential data size threshold $T_{sp}$, the processing device proceeds to operation 518. In one embodiment, the sequential data size satisfies the sequential data size threshold $T_{sp}$ when the sequential data size is greater than sequential data size threshold $T_{sp}$.

If the sequential data size of the streaming data received at operation 502 does not satisfy the sequential data size threshold $T_{sp}$, the processing device proceeds to operation 516. In one embodiment, the sequential data size fails to satisfy the sequential data size threshold $T_{sp}$ when the sequential data size is less than or equal to sequential data size threshold $T_{sp}$. The value of sequential data size threshold $T_{sp}$ can be determined, for example, based on the requirements of each particular design or implementation of memory subsystem 110, multi-partition file system manager 113, and/or multi-partition file system 150.

At operation 514, the processing device writes the streaming data received at operation 502 to a third file system partition, such as third file system partition 206. For example, the processing device writes streaming data that contains file system metadata to the second file system partition.

At operation 516, the processing device writes the streaming data received at operation 502 to a second file system partition, such as second file system partition 204. For example, the processing device writes streaming data that contains AI metadata to the second file system partition.

At operation 518, the processing device writes the streaming data received at operation 502 to a first file system partition, such as first file system partition 202. For example, the processing device writes streaming data that contains a video or snapshot to the first file system partition.

Figure 6:
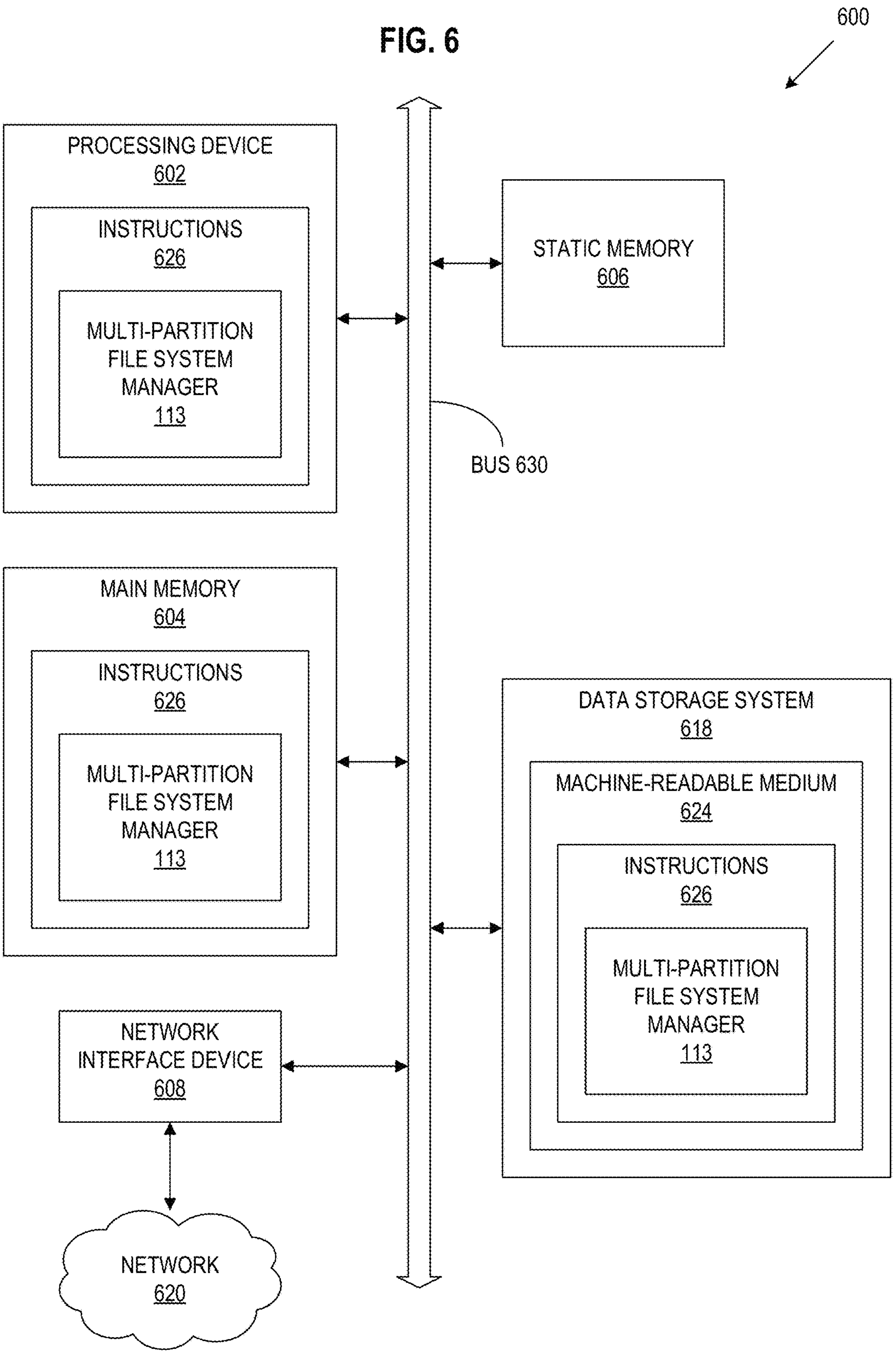
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the multi-partition file system manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to a multi-partition file system manager component (e.g., the multi-partition file system manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 500 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below and/or elsewhere in this disclosure.

In an example 1, a method includes receiving a plurality of configurable arguments including (i) partition sizes for a plurality of file system partitions having different data management capabilities, (ii) a chunk size threshold, and (iii) a threshold sequential data size, creating a file system, including creating the plurality of file system partitions in accordance with the partition sizes, in response to streaming data being received, determining, based on the streaming data, a chunk size and whether the streaming data is sequential data, a first type of metadata, or a second type of metadata, in response to determining that (i) the chunk size satisfies the chunk size threshold and (ii) the streaming data is sequential data of a size that satisfies the threshold sequential data size, writing the sequential data to a first file system partition of the plurality of file system partitions, and in response to determining that (i) the chunk size does not satisfy the chunk size threshold or (ii) (a) the chunk size satisfies the chunk size threshold and (b) the streaming data is the first type of metadata, writing the streaming data to a second file system partition of the plurality of file system partitions.

An example 2 includes the subject matter of example 1, further including, in response to determining that the streaming data is the second type of metadata, writing the streaming data to a third file system partition of the plurality of file system partitions. An example 3 includes the subject matter of example 2, further including configuring at least one of the first file system partition and the second file system partition as visible to users of the file system, and configuring the third file system partition as not visible to users of the file system. An example 4 includes the subject matter of example 2, further including configuring the third file system partition using a single-level cell (SLC) type of non-volatile memory, and configuring the first file system partition and the second file system partition using a type of non-volatile memory that is not the SLC type of non-volatile memory. An example 5 includes the subject matter of example 2, further including, in response to determining that the streaming data includes file system metadata, writing the file system metadata to the third file system partition. An example 6 includes the subject matter of any of examples 1-5, further including configuring the first file system partition according to a first endurance criterion, and configuring the second file system partition according to a second endurance criterion, where the first endurance criterion is higher than the second endurance criterion. An example 7 includes the subject matter of any of examples 1-6, further including configuring the first file system partition according to a first performance criterion, and configuring the second file system partition according to a second performance criterion, where the first performance criterion is higher than the second performance criterion. An example 8 includes the subject matter of any of examples 1-7, further including managing the first file system partition by a slot mapping method, and managing the second file system partition by a method that is not a slot mapping method. An example 9 includes the subject matter of any of examples 1-8, further including in response to determining that the streaming data includes artificial intelligence (AI) metadata, writing the AI metadata to the second file system partition. An example 10 includes the subject matter of any of examples 1-9, further including: in response to determining that the streaming data includes at least one digital image, writing the at least one digital image to the first file system partition.

In an example 11, a system includes a plurality of memory devices, and a processing device, operatively coupled with the plurality of memory devices, to receive streaming data, determine, based on the streaming data, a chunk size and whether the streaming data is sequential data, a first type of metadata, or a second type of metadata, in response to determining that (i) the chunk size satisfies a chunk size threshold and (ii) the streaming data is sequential data of a size that satisfies a threshold sequential data size, writing the sequential data to a first file system partition of a file system including a plurality of file system partitions, and in response to determining that (i) the chunk size does not satisfy the chunk size threshold or (ii) (a) the chunk size satisfies the chunk size threshold and (b) the streaming data is the first type of metadata, writing the streaming data to a second file system partition of the plurality of file system partitions.

An example 12 includes the subject matter of example 11, where the first file system partition includes a first type of non-volatile memory and the second file system partition includes a second type of non-volatile memory. An example 13 includes the subject matter of example 11 or example 12, where the processing device is further to, in response to determining that the streaming data is the second type of metadata, write the second type of metadata to a third file system partition of the plurality of file system partitions instead of the first file system partition or the second file system partition. An example 14 includes the subject matter of any of examples 11-13, where the first file system partition is configured according to a first endurance criterion, the second file system partition is configured according to a second endurance criterion, and the first endurance criterion is higher than the second endurance criterion. An example 15 includes the subject matter of any of examples 11-14, where the first file system partition is configured according to a first performance criterion, the second file system partition is configured according to a second performance criterion, and the first performance criterion is higher than the second performance criterion. An example 16 includes the subject matter of any of examples 11-15, where the first file system partition is managed by a slot mapping method, and the second file system partition is managed by a method that is not a slot mapping method. An example 17 includes the subject matter of any of examples 11-16, where the processing device is further to, in response to determining that the streaming includes artificial intelligence (AI) metadata, write the AI metadata to the second file system partition instead of the first file system partition. An example 18 includes the subject matter of any of examples 11-17, where the processing device is further to, in response to determining that the streaming includes at least one digital image, write the at least one digital image to the first file system partition instead of the second file system partition.

In an example 19, a non-transitory computer-readable storage medium includes instructions that, when executed by a processing device, cause the processing device to receive streaming data, determine, based on the streaming data, a chunk size and whether the streaming data is sequential data, a first type of metadata, or a second type of metadata, in response to determining that (i) the chunk size satisfies a chunk size threshold and (ii) the streaming data is sequential data of a size that satisfies a threshold sequential data size, writing the sequential data to a first file system partition of a file system including a plurality of file system partitions, and in response to determining that (i) the chunk size does not satisfy the chunk size threshold or (ii) (a) the chunk size satisfies the chunk size threshold and (b) the streaming data is the first type of metadata, writing the streaming data to a second file system partition of the plurality of file system partitions.

An example 20 includes the subject matter of example 19, where the processing device is further to, in response to determining that the streaming includes artificial intelligence (AI) metadata, write the AI metadata to the second file system partition instead of the first file system partition, and in response to determining that the streaming includes at least one digital image, write the at least one digital image to the first file system partition instead of the second file system partition. An example 21 includes the subject matter of example 19 or example 20 in combination with the subject matter of any one or more of examples 2-10 or 12-18.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method, comprising:
receiving streaming data;
determining a chunk size of the streaming data and a sequential data size of the streaming data, wherein the sequential data size comprises a size of sequential time series data of the streaming data written to a contiguous portion of memory;
determining that the chunk size satisfies a chunk size threshold;
determining that the sequential data size satisfies a sequential data size threshold, wherein the sequential data size threshold is a threshold size of sequential time series data written to the contiguous portion of the memory and the chunk size threshold is different from the sequential data size threshold;
in response to determining that both the chunk size satisfies the chunk size threshold and the sequential data size satisfies the sequential data size threshold, selecting a first file system partition of a file system comprising a plurality of file system partitions for writing the streaming data; and
writing the streaming data to the first file system partition.

2. The method of claim 1, further comprising:
receiving additional streaming data;
determining a second chunk size of the additional streaming data and a second sequential data size of the additional streaming data;
in response to determining that (i) the second chunk size does not satisfy the chunk size threshold or (ii) (a) the second chunk size satisfies the chunk size threshold and (b) the additional streaming data is a first type of metadata, writing the additional streaming data to a second file system partition of the plurality of file system partitions.

3. The method of claim 2, further comprising:
configuring the first file system partition according to a first endurance criterion; and
configuring the second file system partition according to a second endurance criterion, wherein the first endurance criterion is higher than the second endurance criterion.

4. The method of claim 2, further comprising:
configuring the first file system partition according to a first performance criterion; and
configuring the second file system partition according to a second performance criterion, wherein the first performance criterion is higher than the second performance criterion.

5. The method of claim 2, further comprising:
managing the first file system partition by a slot mapping method; and
managing the second file system partition by a method that is not a slot mapping method.

6. The method of claim 1, further comprising:
receiving additional streaming data;
in response to determining that the additional streaming data is a type of metadata, writing the additional streaming data to a third file system partition of the plurality of file system partitions.

7. The method of claim 6, further comprising:
configuring the third file system partition using a single-level cell (SLC) type of non-volatile memory; and
configuring the first file system partition using a type of non-volatile memory that is not the SLC type of non-volatile memory.

8. A system comprising:
a plurality of memory devices; and
a processing device, operatively coupled with the plurality of memory devices, to:
receive streaming data;
determine a chunk size of the streaming data and a sequential data size of the streaming data, wherein the sequential data size comprises a size of sequential time series data of the streaming data written to a contiguous portion of memory;
determine that the chunk size satisfies a chunk size threshold;
determine that the sequential data size satisfies a sequential data size threshold, wherein the sequential data size threshold is a threshold size of sequential time series data written to the contiguous portion of the memory and the chunk size threshold is different from the sequential data size threshold;
in response to determining that both the chunk size satisfies the chunk size threshold and the sequential data size satisfies the sequential data size threshold, selecting a first file system partition of a file system comprising a plurality of file system partitions for writing the streaming data; and
write the streaming data to the first file system partition.

9. The system of claim 8, wherein the processing device is further to:
receive additional streaming data;
determine a second chunk size of the additional streaming data and a second sequential data size of the additional streaming data;

in response to determining that (i) the second chunk size does not satisfy the chunk size threshold or (ii) (a) the second chunk size satisfies the chunk size threshold and (b) the additional streaming data is a first type of metadata, write the additional streaming data to a second file system partition of the plurality of file system partitions.

10. The system of claim 9, wherein the processing device is further to:

configure the first file system partition according to a first endurance criterion; and configure the second file system partition according to a second endurance criterion, wherein the first endurance criterion is higher than the second endurance criterion.

11. The system of claim 9, wherein the processing device is further to:

configure the first file system partition according to a first performance criterion; and configure the second file system partition according to a second performance criterion, wherein the first performance criterion is higher than the second performance criterion.

12. The system of claim 9, wherein the processing device is further to:

manage the first file system partition by a slot mapping method; and manage the second file system partition by a method that is not a slot mapping method.

13. The system of claim 8, wherein the processing device is further to:

receive additional streaming data;

in response to determining that the additional streaming data is a type of metadata, write the additional streaming data to a third file system partition of the plurality of file system partitions.

14. The system of claim 13, wherein the processing device is further to:

configure the third file system partition using a single-level cell (SLC) type of non-volatile memory; and configure the first file system partition using a type of non-volatile memory that is not the SLC type of non-volatile memory.

15. A non-transitory computer-readable storage medium comprising instructions that, when executed by a processing device, cause the processing device to:

receive streaming data;

determine a chunk size of the streaming data and a sequential data size of the streaming data, wherein the sequential data size comprises a size of sequential time series data of the streaming data written to a contiguous portion of memory;

determine that the chunk size satisfies a chunk size threshold;

determine that the sequential data size satisfies a sequential data size threshold, wherein the sequential data size threshold is a threshold size of sequential time series data written to the contiguous portion of the memory and the chunk size threshold is different from the sequential data size threshold;

in response to determining that both the chunk size satisfies the chunk size threshold and the sequential data size satisfies the sequential data size threshold, selecting a first file system partition of a file system comprising a plurality of file system partitions for writing the streaming data; and write the streaming data to the first file system partition, wherein the plurality of file system partitions are configured differently according to one or more of: endurance criteria, performance criteria, and/or storage density.

16. The non-transitory computer-readable storage medium of claim 15, wherein the processing device is further to:

receive additional streaming data;

determine a second chunk size of the additional streaming data and a second sequential data size of the additional streaming data;

in response to determining that (i) the second chunk size does not satisfy the chunk size threshold or (ii) (a) the second chunk size satisfies the chunk size threshold and (b) the additional streaming data is a first type of metadata, write the additional streaming data to a second file system partition of the plurality of file system partitions.

17. The non-transitory computer-readable storage medium of claim 16, wherein the processing device is further to:

configure the first file system partition according to a first endurance criterion; and configure the second file system partition according to a second endurance criterion, wherein the first endurance criterion is higher than the second endurance criterion.

18. The non-transitory computer-readable storage medium of claim 16, wherein the processing device is further to:

configure the first file system partition according to a first performance criterion; and configure the second file system partition according to a second performance criterion, wherein the first performance criterion is higher than the second performance criterion.

19. The non-transitory computer-readable storage medium of claim 16, wherein the processing device is further to:

manage the first file system partition by a slot mapping method; and manage the second file system partition by a method that is not a slot mapping method.

20. The non-transitory computer-readable storage medium of claim 15, wherein the processing device is further to:

receive additional streaming data;

in response to determining that the additional streaming data is a type of metadata, write the additional streaming data to a third file system partition of the plurality of file system partitions.

* * * * *